(12) United States Patent
Kodani et al.

(10) Patent No.: US 9,048,715 B2
(45) Date of Patent: Jun. 2, 2015

(54) ROTOR OF MOTOR, METHOD OF PRODUCING THE ROTOR, INNER ROTOR-TYPE BRUSHLESS MOTOR AND METHOD OF PRODUCING THE MOTOR

(75) Inventors: Masayuki Kodani, Nagano (JP); Keisuke Wakabayashi, Gunma (JP); Nobuyuki Kabasawa, Gunma (JP); Yasuaki Motegi, Gunma (JP)

(73) Assignees: SHINANO KENSHI KABUSHIKI KAISHA, Ueda-shi (JP); YAMADA MANUFACTURING CO., LTD., Kiryu-shi (JP)

( * ) Notice: Subject to any disclaimer, the term of this patent is extended or adjusted under 35 U.S.C. 154(b) by 315 days.

(21) Appl. No.: 13/555,670

(22) Filed: Jul. 23, 2012

(65) Prior Publication Data

US 2013/0069469 A1 Mar. 21, 2013

(30) Foreign Application Priority Data

Sep. 20, 2011 (JP) .................................. 2011-204913

(51) Int. Cl.
*H02K 15/03* (2006.01)
*H02K 1/27* (2006.01)

(52) U.S. Cl.
CPC ........... *H02K 15/03* (2013.01); *Y10T 29/49012* (2015.01); *H02K 1/2733* (2013.01)

(58) Field of Classification Search
CPC ............................ H02K 15/03; H02K 1/2733
USPC ............................ 310/43, 45, 156.21, 156.23, 310/156.28–156.29
See application file for complete search history.

(56) References Cited

U.S. PATENT DOCUMENTS

| 3,858,308 | A | * | 1/1975 | Peterson .......................... 29/598 |
| 4,206,379 | A | * | 6/1980 | Onda ......................... 310/156.12 |
| 5,861,695 | A | * | 1/1999 | Brassard ................... 310/156.43 |
| 6,548,925 | B2 | * | 4/2003 | Noble et al. ..................... 310/74 |
| 7,120,986 | B2 | * | 10/2006 | Kojima et al. .................. 29/596 |
| 8,039,998 | B2 | * | 10/2011 | Masuzawa et al. ............. 310/44 |
| 8,080,907 | B2 | * | 12/2011 | Jeung .............................. 310/51 |

FOREIGN PATENT DOCUMENTS

| JP | 58-178496 | U | 11/1983 |
| JP | 03-237292 | A | 10/1991 |
| JP | 06-315245 | A | 11/1994 |
| JP | 2004-147395 | A | 5/2004 |
| JP | 2004-343817 | A | 12/2004 |
| JP | 2008-029153 | A | 2/2008 |
| JP | 2008-193847 | A | 8/2008 |

OTHER PUBLICATIONS

Japanese Office Action dated Aug. 20, 2013, in corresponding Japanese Application No. 2011-204913. (4 pages).

* cited by examiner

*Primary Examiner* — Thanh Lam
(74) *Attorney, Agent, or Firm* — Westerman, Hattori, Daniels & Adrian, LLP

(57) ABSTRACT

The rotor of the present invention is capable of improving magnetic characteristics, general versatility and ease of assembly. The rotor comprises: a rotor shaft; a ring-shaped rotor magnet being disposed coaxially with the rotor shaft; and a non-magnetic cover covering an outer circumference of the rotor magnet. The rotor magnet and the cover are integral-molded with molding resin in a state where an outer circumference of the cover is exposed and both end parts and an inner circumference of the rotor magnet are covered with the molding resin.

8 Claims, 3 Drawing Sheets

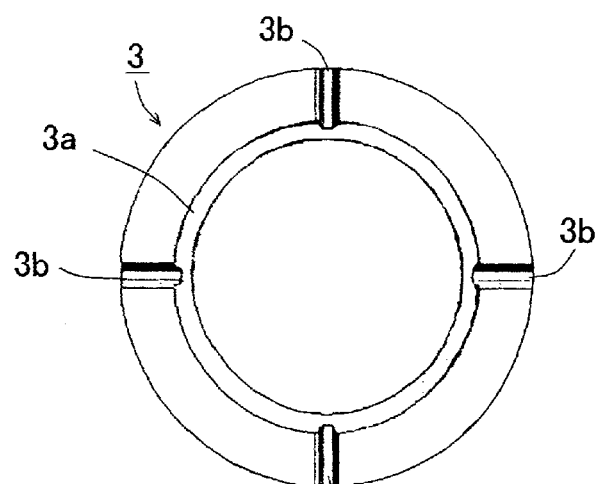
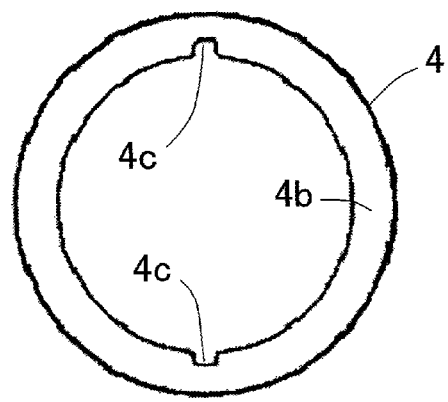
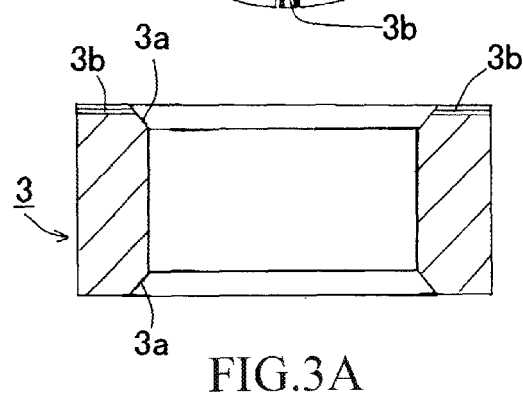
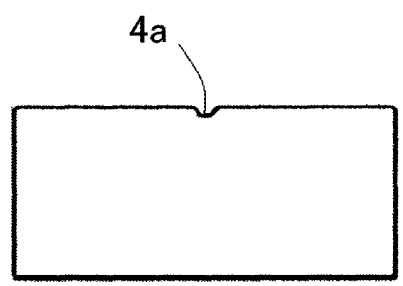
FIG.3A  FIG.3B
FIG.4
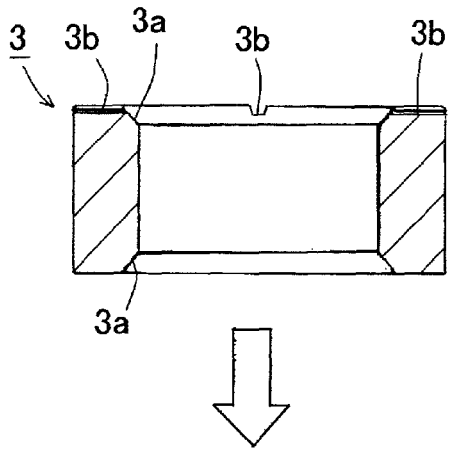
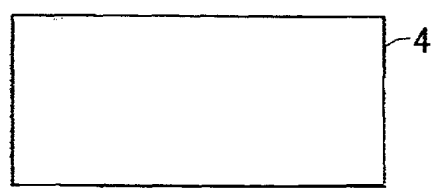

ROTOR OF MOTOR, METHOD OF PRODUCING THE ROTOR, INNER ROTOR-TYPE BRUSHLESS MOTOR AND METHOD OF PRODUCING THE MOTOR

CROSS-REFERENCE TO RELATED APPLICATION

This application is based upon and claims the benefit of priority of the prior Japanese Patent Application No. P2011-204913, filed on Sep. 20, 2011 and the entire contents of which are incorporated herein by reference.

FIELD

The present invention relates to a rotor of a motor, a method of producing the rotor, an inner rotor-type brushless motor and a method of producing the brushless motor.

BACKGROUND

In a conventional inner rotor-type DC brushless motor having a permanent magnet rotor, an antiscattering cover is attached to the rotor so as to prevent the permanent magnet from scattering.

Conventionally, the antiscattering cover is formed into a cylindrical shape, and its diameter is reduced, by a diameter reduction tool, after a permanent magnet is inserted in the antiscattering cover, so that the antiscattering cover can tightly contact the permanent magnet (see Japanese Laid-open Patent Publication No. 2004-343817); and the antiscattering cover is constituted by an inner cylinder part and an outer cylinder part, the inner cylinder part is composed of a shape-memory metal, and the shape of the inner cylinder part is recovered after a rotor magnet is inserted therein, so that the rotor can be assembled (see Japanese Laid-open Patent Publication No. 2008-29153). Further, plate-shaped permanent magnets, whose length is longer than that of an iron core of a rotor, are provided on an outer circumferential face of the iron core and arranged in the circumferential direction, and the iron core and the magnets are integrated by molding with resin (see Japanese Laid-open Patent Publication No. 2004-147395).

The antiscattering covers of Japanese Laid-open Patent Publications No. 2004-343817 and No. 2008-29153 are capable of preventing the permanent magnets from scattering outward, but they cannot prevent the permanent magnet from scattering in the axial direction. From the aspect of rust prevention, the rotor magnets composed of, for example, neodymium cannot be used in a pump because no antiscattering covers are provided to the both axial ends of the rotor.

In Japanese Laid-open Patent Publication No. 2004-343817, the antiscattering cover is plastically deformed to tightly contact the rotor magnet, so production steps must be increased and the magnet will be easily cracked.

In case that the permanent magnets are integrated by molding as described in Japanese Laid-open Patent Publication No. 2004-147395, a thickness of the resin is added to the outer circumferential face of the rotor, so magnetic gaps between the rotor and stator teeth must be increased and magnetic loss must be also increased.

Further, the magnets will be damaged by molding pressure when an inner part of the ring-shaped magnet is molded with the resin.

SUMMARY

Accordingly, it is an object to provide a rotor of a motor, which is capable of solving the above described problems of the conventional technologies, a method of producing the rotor, a high performance and high versatile inner rotor-type brushless motor including the rotor and a method of producing the brushless motor. Namely, in the rotor of the present invention, magnetic characteristics, general versatility and ease of assembly can be improved.

To achieve the object, the present invention has following structures.

Namely, the rotor of the present invention comprises:
  a rotor shaft;
  a ring-shaped rotor magnet being disposed coaxially with the rotor shaft; and
  a non-magnetic cover covering an outer circumference of the rotor magnet,
  wherein the rotor magnet and the cover are integral-molded with molding resin in a state where an outer circumference of the cover is exposed and both end parts and an inner circumference of the rotor magnet are covered with the molding resin.

With this structure, the outer circumference of the magnet is covered with the cover composed of the non-magnetic metal, so that a magnetic gap between stator teeth and the rotor magnet can be smaller and magnetic loss can be reduced, further the axial both end parts of the rotor magnet are covered with the molding resin, so that scattering the magnet can be prevented.

Since the outer circumferential face of the ring-shaped rotor magnet is covered with the cover and the both axial end parts and the inner circumference of the rotor magnet are covered with the molding resin, the rotor can be used in a liquid, so versatility can be expanded.

Preferably, a concave section is formed in an edge part of the outer circumference of the cover so as to increase bonding strength of the molding resin and define a reference position for magnetizing the rotor magnet. With this structure, the rotor magnet can be magnetized after the rotor magnet and the rotor shaft are insert-molded, so that assembling efficiency can be improved.

In the inner rotor-type brushless motor of the present invention, the above described rotor magnet is provided in a space surrounded by a ring-shaped stator. With this structure, magnetic characteristics and magnetic shielding properties can be improved, so that motor characteristics and versatility of the motor can be improved.

The method of producing the above described rotor of the motor comprises the steps of:
  press-fitting a ring-shaped rotor magnet into a cylindrical cover, which is composed of a non-magnetic material and which has an opening section from which a flange is extended inward, so as to cover an outer circumference of the rotor magnet;
  coaxially setting the rotor magnet, which has been covered with the cover, and a rotor shaft in a molding die; and
  insert-molding said members set in the molding die so as to expose an outer circumference of the cover and cover both end parts and an inner circumference of the rotor magnet with molding resin.

With this method, the ring-shaped rotor magnet is press-fitted into the cylindrical cover, and then the insert molding is performed in the state where the outer circumference of the magnet is covered with the cover, so that the ring-shaped magnet is not damaged by molding pressure applied from inside.

Preferably, the method of the present invention further comprises the step of magnetizing the rotor magnet, with using a concave section formed in an edge part of the outer circumference of the cover as a reference position for magnetization, after performing the insert-molding step.

If the rotor magnet is previously magnetized before performing the insert molding, the magnet is magnetically drawn toward the molding die, so handling the magnet must be difficult. However, in the method of the present invention, the magnet is not drawn, so that assembling efficiency of the rotor can be improved.

In the method of producing the inner rotor-type brushless motor, the rotor produced by the above described method is provided in a space surrounded by a ring-shaped stator. With this method, the inner rotor-type brushless motor, whose motor characteristics and versatility are expanded, can be produced efficiently.

By employing the rotor of the present invention and the method of producing the rotor, magnetic characteristics, versatility and assembling efficiency can be improved.

By employing the inner rotor-type brushless motor, in which the rotor of the present invention is used, and the method of producing the inner rotor-type brushless motor, the inner rotor-type brushless motor whose motor characteristics and versatility are expanded can be provided and produced.

BRIEF DESCRIPTION OF THE DRAWINGS

Embodiments of the present invention will now be described by way of examples and with reference to the accompanying drawings, in which:

FIG. 3A includes a plan view and a sectional view of a rotor magnet;

FIG. 3B includes a plan view and a sectional view of a cover;

FIG. 4 shows a method of producing the rotor; and

DETAILED DESCRIPTION OF THE EMBODIMENTS

Preferred embodiments of the rotor and the inner rotor-type brushless motor of the present invention will now be described in detail with reference to the accompanying drawings. In the following description, an in-vehicle fan motor (an inner rotor-type DC brushless motor), in which a rotor is disposed in a space surrounded by a ring-shaped stator core, will be explained as an embodiment.

Figure 1:
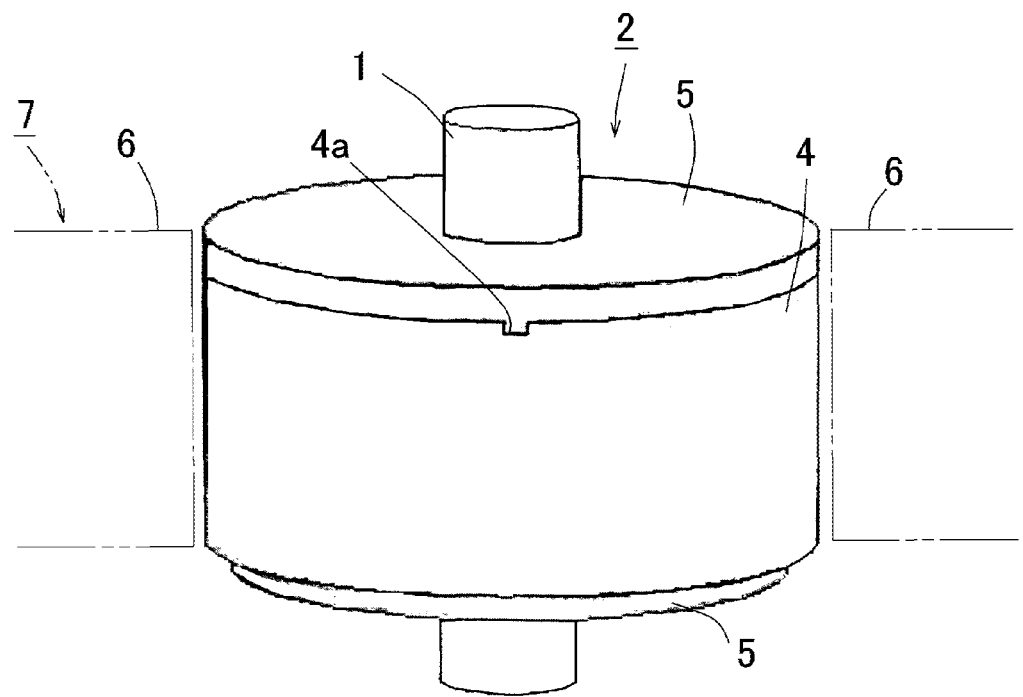
FIG. 1 is an explanation view showing an outline of an inner rotor-type brushless motor relating to the present invention.

An outline of the inner rotor-type DC brushless motor will be explained with reference to FIGS. 1-3B. In FIG. 1, a rotor 2 of the motor, whose shaft 1 is rotatably held by a bearing section, e.g., ball bearing, sleeve bearing, is rotatably supported by a bracket (not shown).

Figure 2:
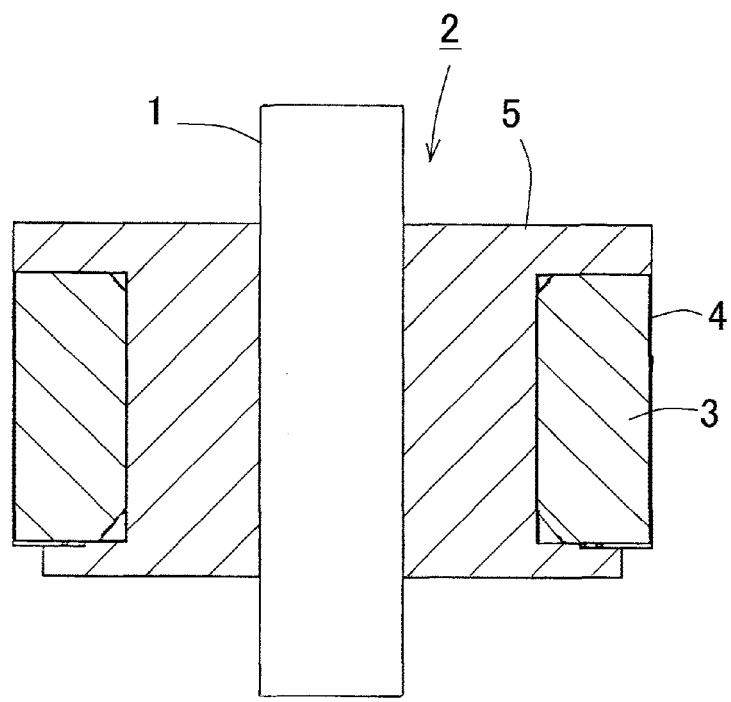
FIG. 2 is a sectional view of a rotor of the motor.

As shown in FIG. 2, the rotor 2 includes a ring-shaped rotor magnet 3, which is disposed coaxially with the rotor shaft 1, and a cover 4, which is composed of a non-magnetic metal, e.g., stainless steel, and which covers an outer circumference of the rotor magnet 3. The rotor magnet 3 and the cover 4 are integral-molded with molding resin 5 in a state where an outer circumference of the cover 4 is exposed and both axial end parts and an inner circumference of the rotor magnet 3 are covered with the molding resin 5. The molding resin 5 is polymer resin having enough heat resistance and chemical resistance, e.g., polyphenylene sulfide (PPS).

In FIG. 3A, the rotor magnet 3 is, for example, a ferrite magnet, but it may be a rare earth magnet, e.g., neodymium magnet, samarium-cobalt magnet. Chamfered sections 3a are circularly formed along inner edges of the rotor magnet 3. The chamfered sections 3a are formed so as to improve strength of the rotor magnet 3 and prevent the rotor magnet 3 from being cracked. In one axial end part of the rotor magnet 3, which is exposed in a state where the rotor magnet 3 is fitted in the cover 4, a plurality of grooves, e.g., four grooves 3b, are formed in the radial directions. The grooves 3b are formed so as to improve bonding strength between the rotor magnet 3 and the molding resin 5.

In FIG. 3B, a flange 4b is formed at one end of the cylindrical cover 4 and radially extended inward.

When the rotor magnet 3 is press-fitted into the cover 4, the flange 4b receives the rotor magnet 3 and acts as a guide for setting in a molding die. Concave sections 4c are formed in an inner edge part of the flange 4b and oppositely disposed so as to improve bonding strength between the cover 4 and the molding resin 5.

With the above described structure, the outer circumference of the rotor magnet 3 is covered with the non-magnetic cover 4, so that the gap between stator teeth 6 and the rotor magnet 3 can be made small and magnetic loss can be reduced. Further, the both axial end parts of the rotor magnet 3 are covered with the molding resin 5, so that scattering the magnet 3 can be prevented.

As described above, the outer circumference of the ring-shaped rotor magnet 3 is covered with the cover 4 and the both axial end parts and the inner circumference of the rotor magnet 3 are covered with the molding resin 5, so that the rotor 2 can be attached in, for example, a pump for pumping a liquid. Versatility of the rotor 2 can be expanded.

In FIG. 1, one or a plurality of concave sections 4a are formed in an outer edge part of the cover 4. The concave sections 4a are formed so as to increase bonding strength between the cover 4 and the molding resin 5 and formed as a reference position for magnetizing the rotor magnet 3. Therefore, the rotor magnet 3 can be magnetized after insert-molding the rotor magnet 3 and the rotor shaft 1, so that an efficiency of assembling the rotor 2 can be improved.

The stator teeth 6 of the ring-shaped stator 7 are disposed on the outer side of the cover 4, which covers the rotor magnet 3. Motor coils (not shown) are respectively formed on the stator teeth 6.

With this structure, magnetic characteristics and a sealing property of the rotor 2 can be improved, so that characteristics and versatility of the motor can be expanded.

Next, production steps of the rotor 2 will be explained with reference to FIGS. 4-5B.

In FIG. 4, the ring-shaped rotor magnet 3 is press-fitted into the cylindrical cover 4, which is composed of the non-magnetic metal, e.g., stainless steel, and in which the flange 4b is inwardly extended from the one open end of the cover 4. Therefore, the cover 4 covers the outer circumference of the rotor magnet 3.

Figure 5A:
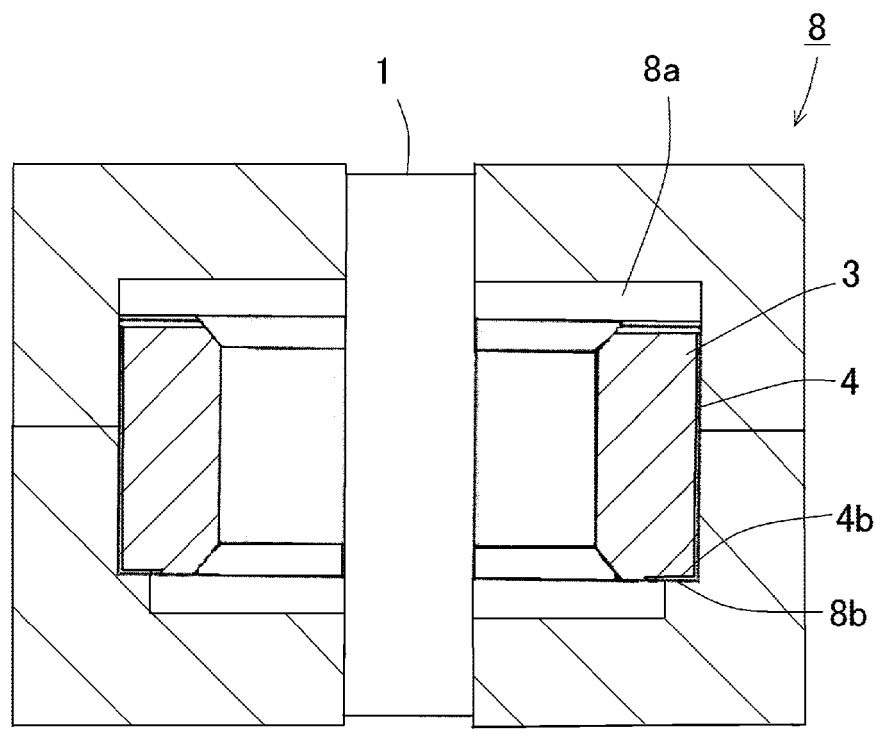
FIGS. 5A and 5B show production steps of the rotor following the step shown in FIG. 4.
Figure 5B:
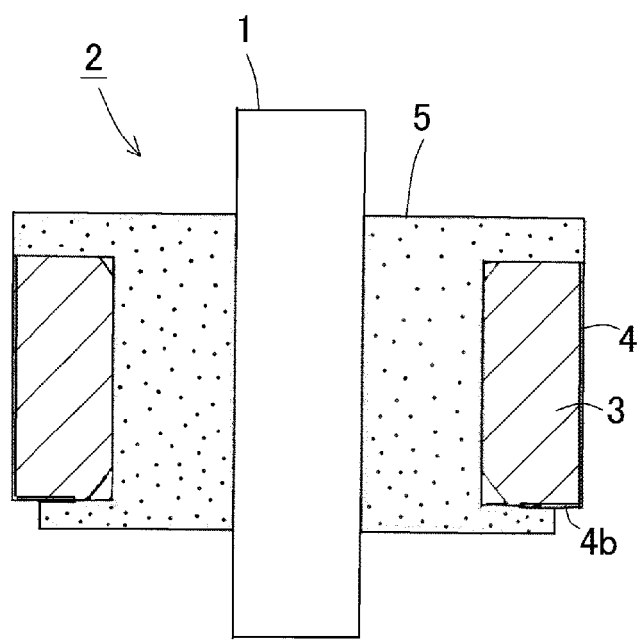

Next, as shown in FIG. 5A, the rotor magnet 3, which has been covered with the cover 4, and the rotor shaft 1 are coaxially set in a cavity 8a of a molding die 8, and then they are clamped. During this operation, the cover 4 is guided and set by a step-shaped section 8b of the cavity 8a. After setting them, the molding die 8 is closed and the molding resin 5, e.g., PPS, is injected into the cavity 8a. The insert-molded rotor 2 is shown in FIG. 5B. In the insert-molded rotor 2, the outer circumference of the cover 4 of the rotor 2 is exposed, but the both end parts and the inner circumference of the rotor magnet 3 are covered with the molding resin 5.

Since the insert molding is performed in the state where the ring-shaped rotor magnet 3 is press-fitted in the cover 4 and the outer circumference of the rotor magnet 3 is covered with the cover 4, the ring-shaped magnet 3 is not damaged by molding pressure applied from inside.

After performing the insert-molding step, the rotor magnet 3 is magnetized, by a magnetizing device (not shown), with using the concave section or sections 4a formed in the edge part of the outer circumference of the cover 4 as the reference position or positions for magnetization.

If the rotor magnet 3 is previously magnetized before performing the insert molding, the rotor magnet 3 is magnetically drawn toward the molding die 8 and handling the magnet must be difficult. However, in the above described magnetizing step of the present embodiment, the rotor magnet is not drawn, so that an assembling efficiency can be improved.

In the inner rotor-type brushless motor, the rotor 2 produced by the above described method is provided in a space surrounded by the ring-shaped stator 7, in which the motor coils (not shown) are formed, and the rotor shaft 1 is rotatably supported by the bracket. Therefore, the inner rotor-type brushless motor, whose motor characteristics and versatility are improved, can be produced efficiently.

The inner rotor-type brushless motor, which has been produced by the above described production method, can be used in a wide fields, e.g., fan motor, pumping motor.

Note that, in case that a rare earth magnet is used as the rotor magnet 3 of a pumping motor, a step-shaped section is preferably formed in the cover 4 so as to make a labyrinth structure. By the labyrinth structure, causing rust on the rotor magnet 3 can be prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alternations could be made hereto without departing from the spirit and scope of the invention.

What is claimed is:

1. A rotor of a motor, comprising:
    a rotor shaft;
    a ring-shaped rotor magnet disposed coaxially with the rotor shaft; and
    a cover composed of a non-magnetic metal and formed into a cylindrical shape, the cover covering an outer circumference of the rotor magnet, wherein
    the rotor magnet and the cover are integral-molded with molding resin in a state where an outer circumference of the cover is exposed and both end parts and an inner circumference of the rotor magnet are covered with the molding resin,
    the rotor magnet is press-fit in the cover in a state where one axial end of the rotor magnet contacts a flange, which is formed in one end part of the cover, and the other axial end surface of the rotor magnet is flush with the other end surface of the cover, and
    a plurality of grooves are radially formed, at regular intervals, in the other axial end surface of the rotor magnet so as to improve bonding strength between the rotor magnet and the molding resin.

2. The rotor according to claim 1, wherein a concave section is formed in an edge part of the outer circumference of the cover so as to increase bonding strength of the molding resin and define a reference position for magnetizing the rotor magnet.

3. An inner rotor-type brushless motor, wherein the rotor magnet of claim 1 is provided in a space surrounded by a ring-shaped stator.

4. A method of producing the rotor of a motor according to claim 1, said method comprising the steps of:
    press-fitting a ring-shaped rotor magnet into a cylindrical cover, which is composed of a non-magnetic material and which has an opening section from which a flange is extended inward, so as to cover an outer circumference of the rotor magnet;
    coaxially setting the rotor magnet, which has been covered with the cover, and a rotor shaft in a molding die; and
    insert-molding said members set in the molding die so as to expose an outer circumference of the cover and cover both end parts and an inner circumference of the rotor magnet with molding resin.

5. The method according to claim 4, further comprising the step of magnetizing the rotor magnet, with using a concave section formed in an edge part of the outer circumference of the cover as a reference position for magnetization, after performing said insert-molding step.

6. A method of producing an inner rotor-type brushless motor, wherein the rotor produced by the method of claim 4 is provided in a space surrounded by a ring-shaped stator.

7. An inner rotor-type brushless motor, wherein the rotor magnet of claim 2 is provided in a space surrounded by a ring-shaped stator.

8. A method of producing an inner rotor-type brushless motor, wherein the rotor produced by the method of claim 5 is provided in a space surrounded by a ring-shaped stator.

* * * * *